United States Patent [19]
Kurimoto et al.

[11] 3,909,923
[45] Oct. 7, 1975

[54] NUMERICALLY CONTROLLED MACHINE TOOL WITH MISCELLANEOUS FUNCTION CONTROL CIRCUIT TO REDUCE UNPRODUCTIVE PERIODS TO A MINIMUM

[75] Inventors: Mikishi Kurimoto, Nagoya; Hiroyasu Takegawa, Kariya, both of Japan

[73] Assignee: Toyoda Koki Kabushiki Kaisha, Japan

[22] Filed: Dec. 14, 1972

[21] Appl. No.: 315,011

[52] U.S. Cl. .................. 29/568; 29/26 A; 408/3; 408/35
[51] Int. Cl.² .......................................... B23Q 3/157
[58] Field of Search ............ 29/26 A, 568; 318/567, 318/569, 574; 408/3, 35

[56] References Cited
UNITED STATES PATENTS

| | | | |
|---|---|---|---|
| 2,838,963 | 6/1958 | Good et al. | 408/3 |
| 3,125,796 | 3/1964 | Brainard | 29/26 A |
| 3,259,957 | 7/1966 | Stobbe | 29/26 |
| 3,559,256 | 2/1971 | Lemelson | 29/563 X |

*Primary Examiner*—Robert L. Spruill
*Assistant Examiner*—Z. R. Bilinsky
*Attorney, Agent, or Firm*—Oblon, Fisher, Spivak, McClelland & Maier

[57] ABSTRACT

A numerically controlled machine tool is provided with a miscellaneous function control circuit which comprises a first relay circuit for starting miscellaneous functions when the operation of a feed device is completed, a second relay circuit for starting miscellaneous functions instantaneously when the feed operation is started, a command circuit for operating either the first or the second relay circuit in accordance with programmed information, and a control circuit operated by the first and second relay circuit for controlling a series of operation cycles of the miscellaneous functions, whereby the starting time of each of the miscellaneous functions can be selected in accordance with the programmed information coded on a record such as a punched tape.

5 Claims, 5 Drawing Figures

NUMERICALLY CONTROLLED MACHINE TOOL WITH MISCELLANEOUS FUNCTION CONTROL CIRCUIT TO REDUCE UNPRODUCTIVE PERIODS TO A MINIMUM

BACKGROUND OF THE INVENTION

1. Field Of The Invention

The present invention generally relates to a numerically controlled machine tool, and more particularly to a numerically controlled machine tool with a miscellaneous function control circuit to reduce unproductive periods to a minimum.

2. Description Of The Prior Art

In the past, machining operations with numerically controlled machine tools were generally performed in accordance with programmed numerical information by the combination of feed movements of movable members such as a work table, a saddle, a spindle carriage, and the like mainly for operating a workpiece and by miscellaneous functions such as a tool changing operation, a table indexing operation, control of spindle rotation, and the like which were annexed to the feed movements. These miscellaneous functions were conventionally performed by appropriately interrupting the feed movements. In such miscellaneous functions, on-off control of coolant, clamp and unclamp of feed shaft, and the like could be accomplished in a short time owing to a relatively few moving elements, while the tool changing operation, the table indexing operation, and the like required a relatively long time to be accomplished owing to a plurality of moving elements and a series of sequential operations therebetween. Such long miscellaneous functions inevitably made the interruption intervals in a series of machining operations long thereby undesirably increasing the amount of unproductive time into the total time of a machining operation.

SUMMARY OF THE INVENTION

Accordingly, one object of the present invention is to generally provide a new and improved unique numerically controlled machine tool with high efficiency by reducing the unproductive periods during which a workpiece is not being operated.

Another object of the present invention is to provide a new and improved unique numerically controlled machine tool which more efficiently and effectively control miscellaneous functions, a part or all of which is accomplished while numerically controlled feed operations for movable parts are being performed.

Still another object of the present invention is to provide a new and improved unique numerically controlled machine tool provided with an improved miscellaneous function control circuit by which the starting time of miscellaneous functions is selected in accordance with programmed numerical information coded on a record such as a punched tape.

Briefly, in accordance with this invention, these and other objects are achieved by providing a numerically controlled machine tool provided with a feed device for moving a tool in three dimensions relative to a work table, an automatic tool changer, a numerical control device for automatically controlling the feed device in accordance with programmed information, and an improved miscellaneous function control circuit, as mentioned hereupon, for controlling miscellaneous functions such as a tool changing operation. The improved miscellaneous function control circuit comprises a first relay circuit to start the miscellaneous functions after the completion of operation of the feed device, and a second relay circuit to start the miscellaneous functions coincident in time with the starting of operation of the feed device.

A command circuit is provided to operate either the first or the second relay circuit in accordance with programmed information. A control circuit operated by the relay contacts of the first and the second relay circuit controls a series of operation cycles of the miscellaneous functions.

According to the present invention, a part or all of each of various miscellaneous functions can be started at the same time as the start of feed movements of a tool and movable members providing the miscellaneous function does not bring the interference of a tool with a workpiece, the movable members, or the like during the machining operation and does not adversely affect the machining accuracy. Therefore, with the present invention, it is also possible that a part of the miscellaneous function be started at the same time as the start of feed movement of the movable member, and that the remainder of the miscellaneous functions be started when the operation of the feed device is completed.

BRIEF DESCRIPTION OF THE DRAWINGS

The foregoing and other objects of the present invention will be more fully appreciated as the same becomes better understood from the following detailed description of the preferred embodiments when considered in connection with the accompanying drawings, in which.

DETAILED DESCRIPTION OF THE PREFERRED EMBODIMENTS

Figure 1:
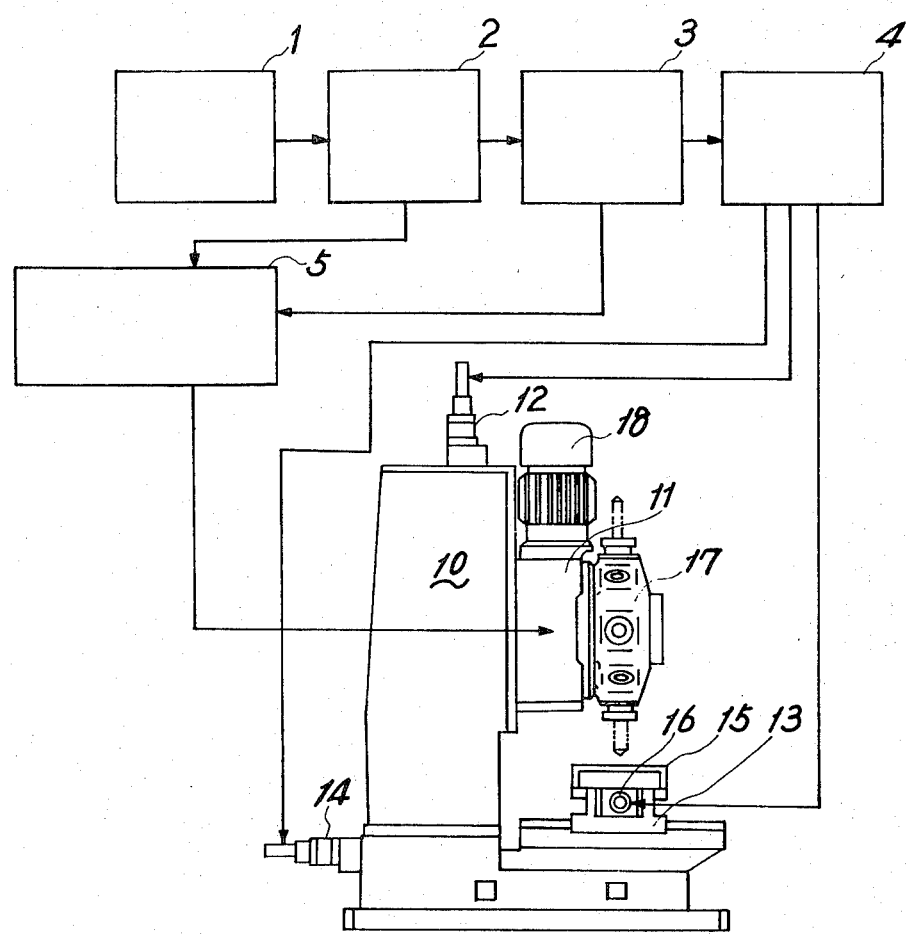
FIG. 1 is a schematic view showing a machine tool of a turret type together with a block diagram containing a miscellaneous function control circuit according to the present invention.

Referring now to the drawings, wherein like reference numerals refer to identical or corresponding parts throughout the several views. and more particularly to FIG. 1 thereof, wherein a machine tool 10 is shown as being provided with a tool changing device of the well known turret type. A feed motor 12 is mounted on a column of the machine tool 10 to move a carriage 11 in a vertical direction. A saddle 13 and a table 15 are respectively moved by feed motors 14 and 16. A turret head 17 is indexably mounted on the carriage 11. A plurality of tools are rotatably carried by the turret head 17. The tool indexed to a machining station is rotated by a driving motor 18 to perform a machining operation on a workpiece fixed to the table 15. Rotations of the motors 12, 14 and 16 are controlled by a drive circuit 4 which is operable in response to pulse signals.

The pulse signals are transmitted and distributed by a main control unit 3 in accordance with command data read by a tape reader 1. The command data are stored in a predetermined sequence on a tape. Connected between the tape reader 1 and the main control unit 3 for discriminating the command data is a decoder 2, by which the command data for miscellaneous functions, such as tool changing, main spindle stopping, and table indexing operations, are transmitted to a miscellaneous function control circuit 5. It is to be noted that tape reader 1, decoder 2, main control unit 3, and drive circuit 4 are conventional and sold by Fujitsu Ltd., Tokyo, Japan as FUNUC MODEL 240. The miscellaneous function control circuit 5 which performs miscellaneous functions of tool changing, main spindle stopping, and table indexing operations will be described in detail hereunder.

In a circuit (shown in FIGS. 2, 3, and 4) for effecting these miscellaneous functions, all switch contacts bear the same reference as the associated relays, but with an additional suffix to distinguish the contacts from the associated relays. Normally open contacts are designated by spaced parallel lines while normally closed contacts are designated by spaced parallel lines with a diagonal line therethrough. Two lines L1 and L2 are connected with a power source (not shown).

Figure 2:
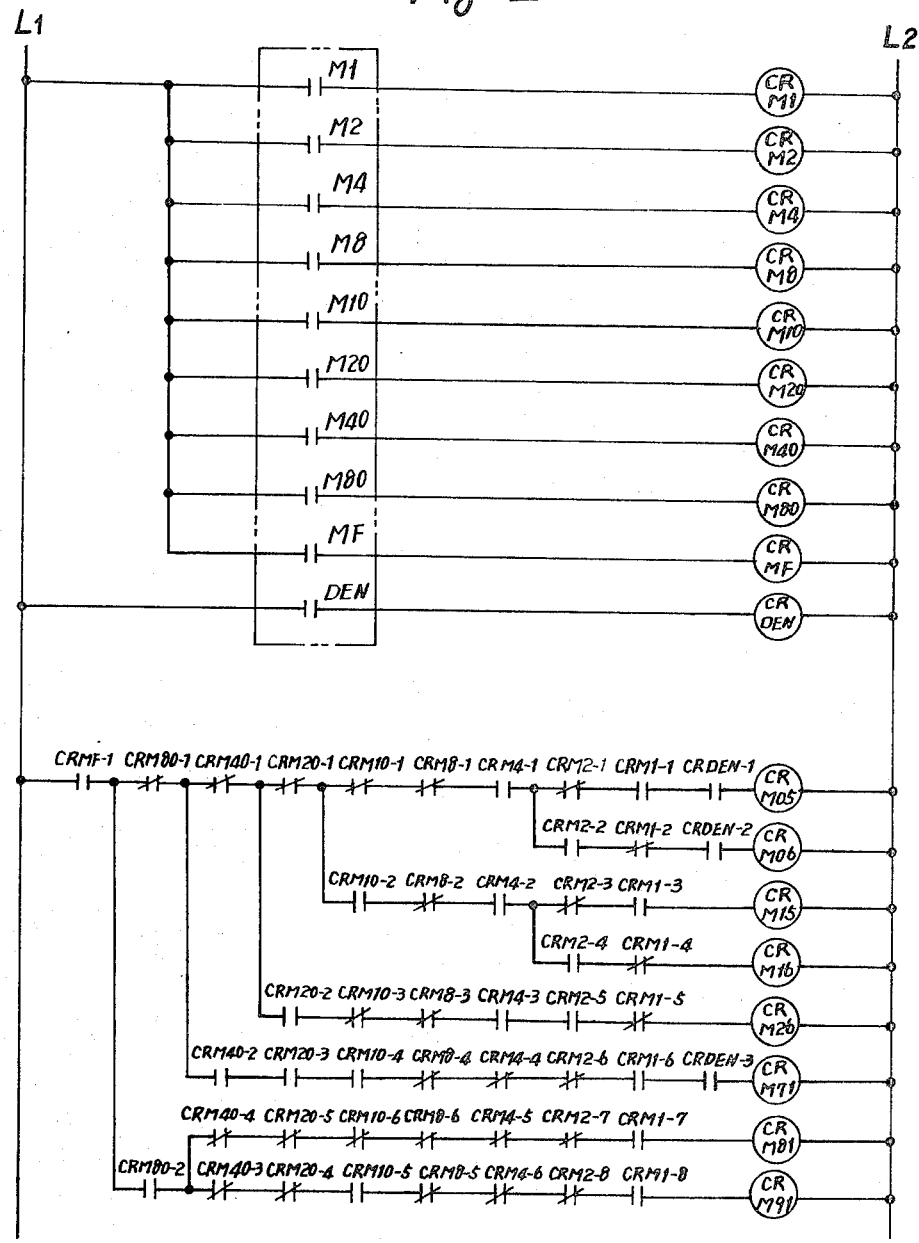
FIG. 2 is a logic circuit for identifying miscellaneous functions.
Figure 3:
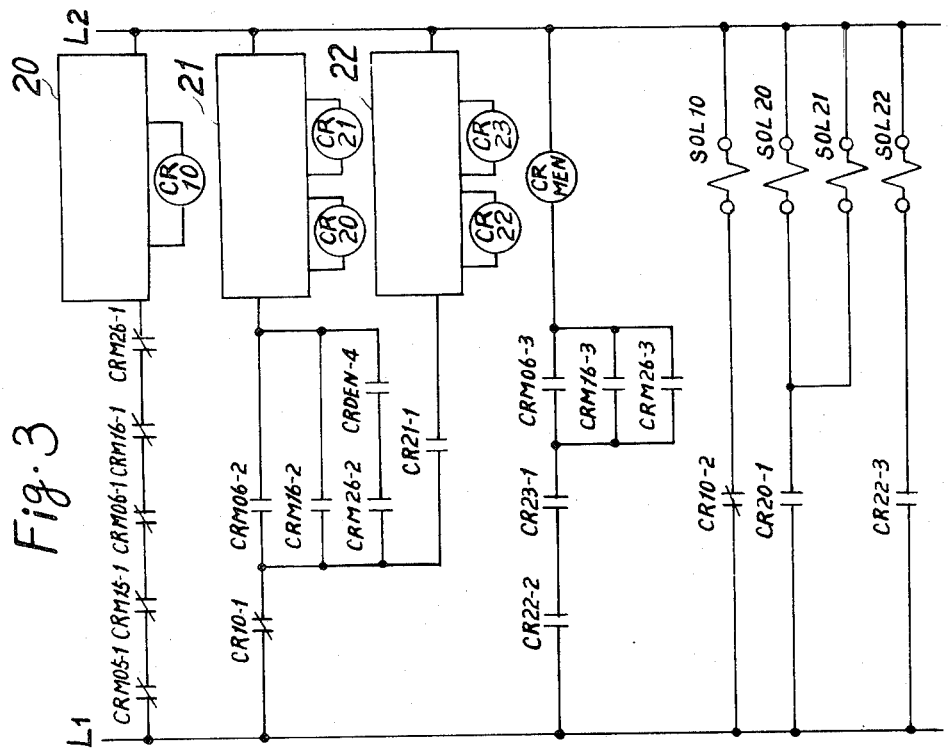
FIG. 3 is a control circuit for a turret-indexing operation.

The upper portion of the circuit of FIG. 2 shows a diagram of the relay circuit responsive to the tape command, wherein switch contacts M1, M2, M4, - - - , M80, and MF are opened or closed in accordance with the discriminating result of decoder 2 to energize or de-energize relays CRM1, CRM2, - - - , CRM80, and CRMF which are respectively associated therewith, the switch contacts and the relays being provided between lines L1 and L2. A contact DEN is closed upon the completion of pulse distribution to the feed motor or motors to thereby energize a relay CRDEN connected thereto.

The lower portion of the circuit of FIG. 2 shows a diagram of the relay which is responsive to the circuit in the upper portion thereof to select the mode of operation of the miscellaneous functions. For example, when switch contacts M1, M4, M10, and MF are closed in accordance with the tape command, the associated relays CRM1, CRM4, CRM10, and CRMF are energized to thereby close the respective contacts CRM1-3, CRM4-2, CRM10-2, and CRMF-1. Thus relay CRM15 is energized to thereby effect a main spindle stopping operation. Although a relay CRM05 is also operable to instruct the stoppage of a main spindle, the relay CRM05 is energized first when the switch contact DEN is further closed in accordance with the pulse distribution completion signal, that is, the relays CRM15 and CRM05 are provided to carry out the same function, but to initiate the function at a different time.

Relays CRM06, CRM16, and CRM26 are operable to instruct the start of a tool chainging operation, wherein only the relay CRM06 is connected in series to the contact CRDEN-2 and is, therefore, not energized so long as the relay CRDEN is not closed by the pulse distribution completion signal which is transmitted from the main control unit 3 to the miscellaneous function control circuit 5.

Relays CRM71, CRM81, and CRM91 are operable to instruct the start of a table indexing operation. Similar to the relay CR06, only the relay CRM71 is connected in series to the contact CRDEN-3 and is not energized so long as the relay CRDEn is not energized by the pulse distribution completion signal.

Accordingly, the relays CRM05, CRM06, and CRM71 are not energized before a feed movement is completed by any of the feed motors 12, 14 and 16. On the other hand, the other relays CRM15, CRM16, CRM26, CRM81, and CRM91 may be instantaneously energized when the tape reader 1 has completed reading the miscellaneous function command on the tape. Therefore, the required miscellaneous function may be started simultaneously with the start of the feed movement by the-feed motor or motors 12, 14, and 16 which are controlled by the numerical data recorded together with the miscellaneous function in the same block of the command data on the tape. The relays CRM16 and CRM81 continuously perform the requred miscellaneous functions to the end thereof and the relays CRM26 and CRM91 direct the machine tool so that the initial part of the miscellaneous functions are performed simultaneously with the feed movements, and the remaining part thereof may be performed after the completion of the feed movements. Such miscellaneous functions are described hereunder with reference to FIGS. 3 and 4.

The circuit 20 for controlling the rotation of a main spindle (not shown in detail but indicated generally at numeral 20) is connected across lines L1 and L2 in series with the normally closed series connected contacts CRM05-1, CRM15-1, CRM06-1, CRM16-1, and CRM16-1. The relay 10 is connected to the circuit 20 so as to be deenergized when at least one of such normally closed contacts is opened. When the relay CR10 is deenergized, the normally closed contact CR10-2 is closed to energize a solenoid SOL10 so that the main spindle is applied with a braking torque and thereby stopped by an appropriate mechanism which is operated by a fluid circuit controlled by the solenoid 10.

A relay CR20 to effect the indexing operation of the turret 17 following the stoppage of the main spindle is connected to a control circuit 21 which controls the indexing operation. The control circuit 21 is connected across lines L1 and L2 with normally open parallel contacts CRM06-2, CRM16-2, and CRM26-2 in series with CRDEN-4, while normally closed contact CR10-1 is disposed between line L1 and the normally open parllel contacts. In case the relay CRM26 is selected for performing the indexing operation of the turret 17, the rotation of the main spindle is stopped simultaneously with the start of the feed movements by opening the normally closed contacts CRM26-1. However, even if the normally open contact CRM26-2 is closed, the indexing operation of the turret 17 is not started until contact CRDEN-4 is closed. In other words, the index-operation of the turret 17 is effected when the feed movement has been accomplished. A relay CR21 connected to the control circuit 21 is energized to thereby close a contact CR21-1 when the completion of the turret-indexing operation is confirmed.

The control circuit 22 for controlling an indexing actuator provided for indexing the turret 17, is connected across lines L1 and L2 with normally closed contact CR10-1 and normally open contact CR21-1. A relay CR22 is connected to the control circuit 22 so as to be energized when the contact CR21-1 is closed. The relay CR22 instructs the start of a return operation of an indexing actuator (not shown) for preparing the following indexing operation of the turret 17. A relay CRMEN for detecting the completion of the required miscellaneous functions is connected across lines L1 and L2 in series with normally open contacts CR22-2 and CR23-1, and parallel connected normally open parallel contacts CRM06-3, CRM16-3, and CRM26-3. A relay CR23 is connected to the control circuit 22 so as to be energized when the return operations of the indexing actuator are completed.

A solenoid SOL20 is connected across lines L1 and L2 with normally open contact CR20-1 for effecting the indexing operation of the turret 17. When the solenoid SOL20 is energized, the conventional indexing operation of the turret 17 is performed as follows by a conventional mechanism. For example, during an indexing operation, a knock pin (not shown) for angularly positioning the turret is disengaged from a notch on the turret; a clutch (not shown) for the main spindle is released; a drive and driven gears (not shown) for transmitting driving torque to rotate the turret 17 are brought into meshing engagement to each other; and then, an indexing actuator (not shown) is operated to rotate the drive gear through an appropriate rack and pinion mechanism, as is well known to those skilled in the art. A solenoid SOL21 is connected across lines L1 and L2 with normally open contact CR20-1 common to the solenoid SOL20 for releasing the clamp mechanism of carriage 11 when energized by the closing of contact CR20-1. A solenoid SOL22 is connected across lines L1 and L2 with a normally open contact CR22-3. When the solenoid SOL22 is energized by the close of contact CR22-3, the return operations of the indexing actuator are performed as follows: the known pin is brought into engagement with the notch; the drive and driven gears are brought out of meshing engagement to each other; the clutch is engaged; and finally the indexing actuator is returned to its initial position. Such return operations of the indexing actuator are started when relay CR22 is energized. The contact (not shown) of relay CR22 within the control circuit 21 is opened simultaneously with the energization of relay CR22 to thereby deenergize the relay CR20 and in turn, solenoids SOL20 and SOL21 are deenergized by the opening of contact CR20-1. Therefore, the turret head 17 is clamped after the engagement of the knock pin with the notch.

Figure 4:
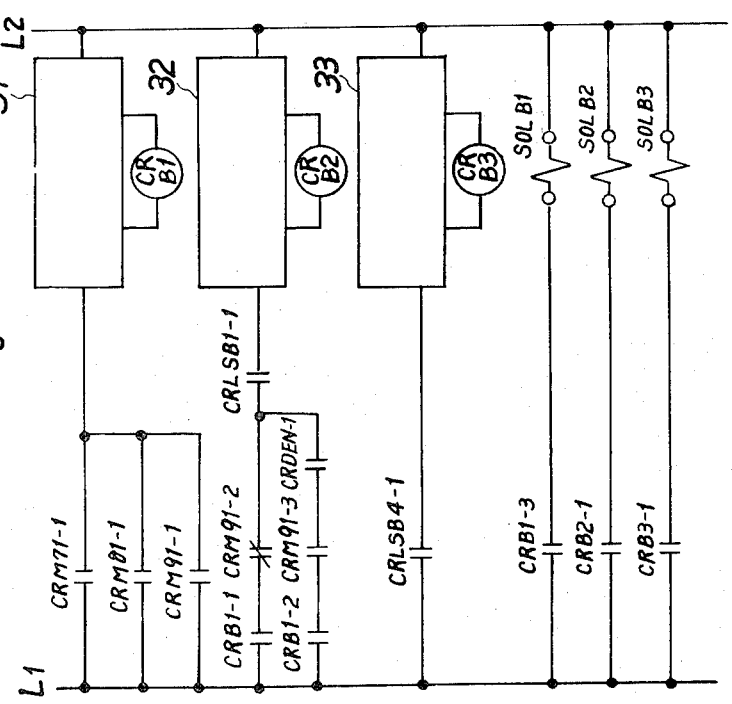
FIG. 4 is a control circuit for a table-indexing operation.

The circuit 31 for controlling the indexing operation of the work table 15 and particularly an upward movement thereof is connected across lines L1 and L2 with normally open contacts CRM71-1, CRM81-1, and CRM91-1 which are connected in parallel relationship with each other, as shown in FIG. 4. The table indexing operation is continuously performed, as is well known to those skilled in the art, as follows: the table 15 is lifted to thereby release the meshing engagement of indexpositioning members (for example, Curvic Couplings); the table is rotated to be indexed; thereafter the table is downwardly moved so that the indexpositioning members may be brought into meshing engagement to each other. A relay CRB1 is connected to the circuit 31 so as to be energized when any one of contacts CRM71-1, CRM81-1, and CRM91-1 is closed. The relay CRB1 is energized to effect the lifting movement or the table 15. A relay CRB2 is connected to a control circuit 32 which in turn controls the indexing operation of the table 15, particularly for rotation thereof for the purpose of indexing. The relay CRB2 is connected across lines L1 and L2 with normally open contacts CRB1-2, CRM91-3, CRDEN-1, CRLSB1-1, and CRB1-1, and with normally closed contact CRM91-2. Series connected normally open contacts CRB1-2, CRM91-3, and CRDEN-1 are connected between line L1 and the contact CRLSB1-1 and in parallel with the series disposed contacts CRB1-1 and CRM91-2. The contact CRLSB1-1 is closed when the table 15 is lifted to the upper motion end thereof. A relay CRB3 to effect the downward movement of table 15 is connected to the control circuit 33 for controlling the indexing operation of table 15, particularly the downward movement thereof. The control circuit 33 is connected across lines L1 and L2 with a normally open contact CRLSB-4-1 which is closed when the indexing rotation of table 15 is stopped.

A solenoid SOLB1 is connected across lines L1 and L2 with a normally open contact CRB1-3 which is closed when the relay CRB1 is energized. When the contact CRB1-3 is closed, the solenoid SOLB1 is energized to thereby lift the table 15 by means of an appropriate actuator controlled thereby. A solenoid SOLB2 is connected across lines L1 and L2 with a normally open contact CRB2-1 which is energized by the relay CRB2. The solenoid SOLB2 is energized by the closing of contact CRB2-1 to thereby index the table 15 by means of an appropriate actuator controlled thereby. A solenoid SOLB3 is connected across lines L1 and L2 with a normally open contact CRB3-1. When the contact CRB3-1 is closed by the relay CRB3, the solenoid SOLB3 is energized to downwardly move the table 15 by means of the first mentioned actuator controlled thereby.

The table indexing operation is performed in a different manner as mentioned hereunder in accordance with the selected relay among the relays CRM71, CRM81 and CRM91. When the relay CRM71 is selected as the table indexing operation, the upward movement, the indexing rotation, and the downward movements of table 15 are continuously performed after the pulse distribution to one of feed motors 12, 13 and 14 is completed. When the relay CRM81 is selected, the table-indexing operation is started simultaneously with the feed movement and is continued in parallel with the feed movement until the last movement thereof since the relay CRM81 is not in interlocking relationship with the pulse distribution completion signal. When the relay CRM91 is selected, the upward movement of table 15 is performed in parallel with the feed movement; however, the table indexing operation is not performed until the pulse distribution is completed.

The detailed description of the circuits 20, 21, 22, 31, 32, 33 is avoided, since the circuits consist of conventional relays and the contacts thereof and the same is not essential for the present invention except for energization and deenergization of the associated relays CR10, CR20, CR21, CR22, CR23, CRB1, CRB2 and CRB3 and are obvious to an ordinary person skilled in the art.

Figure 5:
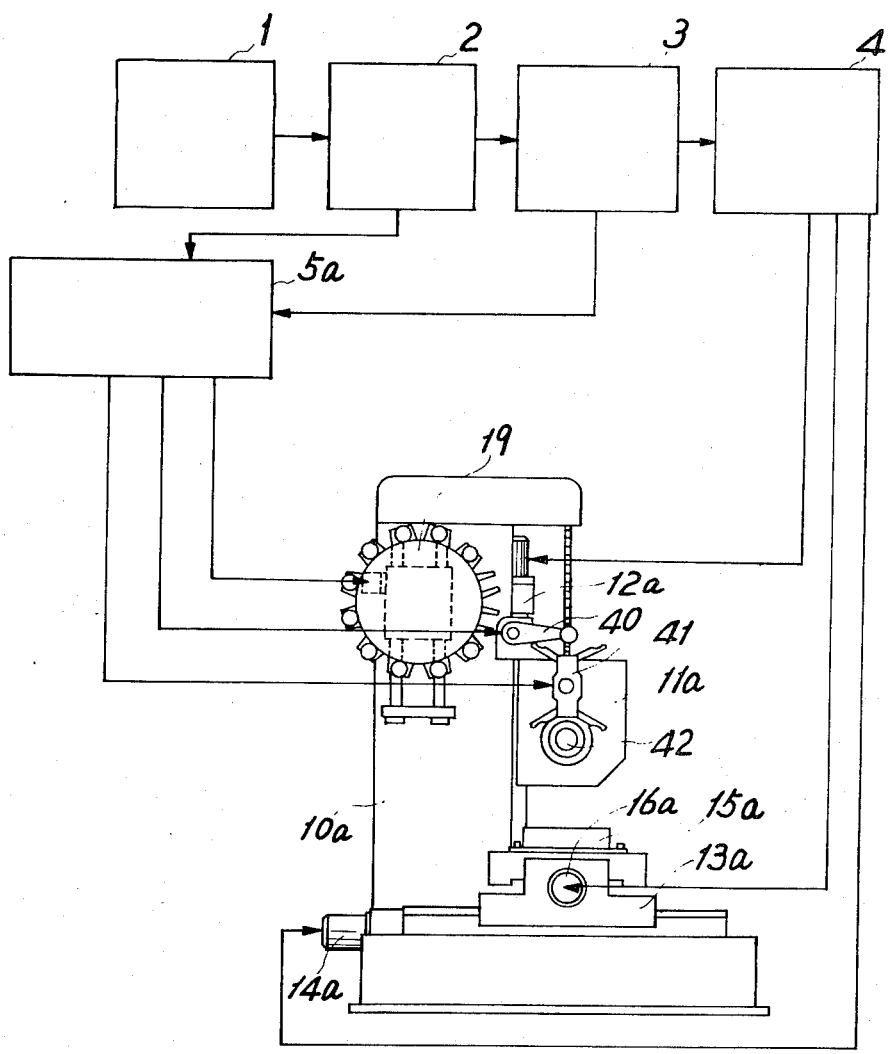
FIG. 5 is a schematic view showing a machine tool with a tool changer of another type together with a block diagram containing a miscellaneous function control circuit according to the present invention.

FIG. 5 shows another machine tool of a type wherein a tool storage magazine 19 stores a plurality of tools on the periphery thereof and a tool is transferred by a sub-arm 40 and a main arm 41 between the magazine 19 and a spindle 42. Such a tool chainging operation may be controlled by a miscellaneous function control circuit 5a in such a manner that it is performed simultaneously when a table 15a, a saddle 13a, and a spindle head 11a are being positioned, whereby unproductive time between the completion of a machining operation by a tool and the start of the machining operation by the following tool is reduced to a minimum.

Obviously, numerous modifications and variations of the present ivention are possible in light of the above teachings. It is therefore understood that within the scope of the appended claims, the invention may be practised otherwise than as specifically described herein.

We claim:

1. A numerically controlled machine tool provided with feed means for performing a three dimensional motion between a tool and a workpiece on a work table, tool changing means for transferring each of a plurality of varied tools in succession to and from a machining station, a miscellaneous function control circuit for controlling miscellaneous functions thereof, and numerical control means for controlling said feed means and said miscellaneous function control circuit in accordance with programmed information, the improvement of said miscellaneous function control circuit comprising:

first relay circuit means for starting one function of said miscellaneous functions when an operation of said feed means is completed;

second relay circuit means for starting said one miscellaneous function independently of the operation of said feed means;

command circuit means for selectively operating one of said first relay circuit means and said second relay circuit means in accordance with said programmed information, said command circuit means including relays operable in response to said programmed information for identifying said miscellaneous functions for operating said second relay circuit means, and an interlocking relay responsive to said numerical control means for operating said first relay circuit means; and control circuit means operated by said one of said first and said second relay circuit means for performing said one miscellaneous function in a mode directed by said one relay circuit means to avoid damage of said machine tool by performances thereof.

2. A numerically controlled machine tool according to claim 1, wherein said first and said second relay circuit means include command relays selectively operated by contacts of said relays and said interlocking relay for identifying and starting said one miscellaneous function.

3. A numerically controlled machine tool according to claim 2, wherein each of said command relays of said first relay circuit means is connected in series to a contact of said interlocking relay.

4. A numerically controlled machine tool according to claim 1, further comprising third relay circuit means for starting a part of said one miscellaneous function independently of operation of said feed means, and for starting the remainder of said one miscellaneous function when the operation of said feed means is completed.

5. A numerically controlled machine tool having tool changing means for transferring each of a plurality of varied tools in succession to and from a machining station, comprising:

at least one machine moveable member;

actuating means for moving said machine moveable member;

feed means for performing a relative motion between a tool and a workpiece in response to programmed information; and miscellaneous function control means for performing miscellaneous functions by operating said actuating means in response to said programmed information, said miscellaneous function control means comprising a first circuit means for detecting a mode of said miscellaneous function and a second circuit means responsive to said first circuit means for controlling an operational sequence of said actuating means in accordance with said detected miscellaneous function mode, said first circuit means comprising a plurality of relay means for identifying said miscellaneous functions in response to said programmed information and interlocking relay means for operating said second circuit means only when the operation of said feed means is completed, and said second circuit means comprising first means for starting one function of said miscellaneous functions when an operation of said feed means is completed, second means for starting said one miscellaneous function independently of the operation of said feed means and third means operated by one of said first and second means for operating said actuating means.

* * * * *